US007849067B2

(12) United States Patent
Vaughan et al.

(10) Patent No.: US 7,849,067 B2
(45) Date of Patent: Dec. 7, 2010

(54) EXTENSIBLE DATA PROVIDER QUERYING AND SCHEDULING SYSTEM

(75) Inventors: Christopher M Vaughan, Seattle, WA (US); Carlos Yeung, Seattle, WA (US); Amit Gupta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 355 days.

(21) Appl. No.: 12/024,098

(22) Filed: Jan. 31, 2008

(65) Prior Publication Data
US 2009/0198649 A1    Aug. 6, 2009

(51) Int. Cl.
  *G06F 17/30*    (2006.01)
(52) U.S. Cl. ....................................................... 707/706
(58) Field of Classification Search ..................... 707/1, 707/3, 4, 10, 706; 703/22
  See application file for complete search history.

(56) References Cited

U.S. PATENT DOCUMENTS

| | | | |
|---|---|---|---|
| 6,278,993 B1 | 8/2001 | Kumar et al. | |
| 6,473,748 B1 * | 10/2002 | Archer | 706/45 |
| 6,571,282 B1 | 5/2003 | Bowman-Amuah | |
| 7,013,303 B2 | 3/2006 | Faybishenko et al. | |
| 7,058,562 B2 * | 6/2006 | Powell | 703/22 |
| 7,209,915 B1 | 4/2007 | Taboada et al. | |
| 2001/0004737 A1 * | 6/2001 | Laux | 707/1 |
| 2003/0115291 A1 | 6/2003 | Kendall et al. | |
| 2006/0242574 A1 | 10/2006 | Richardson et al. | |
| 2006/0265385 A1 * | 11/2006 | Agrawal et al. | 707/10 |
| 2007/0011142 A1 * | 1/2007 | Sattler et al. | 707/3 |
| 2007/0016563 A1 | 1/2007 | Omoigui | |
| 2007/0055731 A1 | 3/2007 | Thibeault | |
| 2007/0150608 A1 | 6/2007 | Randall et al. | |
| 2007/0168336 A1 * | 7/2007 | Ransil et al. | 707/3 |
| 2007/0208694 A1 | 9/2007 | Bayliss et al. | |

OTHER PUBLICATIONS

"Secure Searching with Oracle Secure Enterprise Search", Oracle Corporation, 2007, pp. 1-11.
"Installing the Ultra Search Middle Tier Component on Web Server Hosts", Oracle Corporation, 2002, pp. 1-12.
"Learn about WebSphere applications: Overview and new features", Retrieved from <http://publib.boulder.ibm.com/infocenter/wasinfo/v6r0/index.jsp?topic=/com.ibm.websphere.express.doc/info/exp/ae/welc6tech_ovrex.html on Oct. 25, 2007>, last updated Aug. 29, 2007, 12 pages.

* cited by examiner

*Primary Examiner*—Etienne P LeRoux

(57) ABSTRACT

Embodiments provide an independent layer between an application user interface and various data sources so that both the user interface and data sources can be added to, removed, or modified without affecting the other. The independent layer provides scalability to allow data sources and data providers to be plugged into a system in an easy manner. In one or more embodiments, the independent layer provides a common set of query APIs that can be used by client applications to make queries on one or more data sources. The independent layer then communicates the queries to one or more data providers associated with individual data sources. Queries are executed on the data sources and results are returned back up through the data providers and independent layer for consumption by a client application. In at least some embodiments, the client application comprises a web browser that makes use of the independent layer.

17 Claims, 7 Drawing Sheets

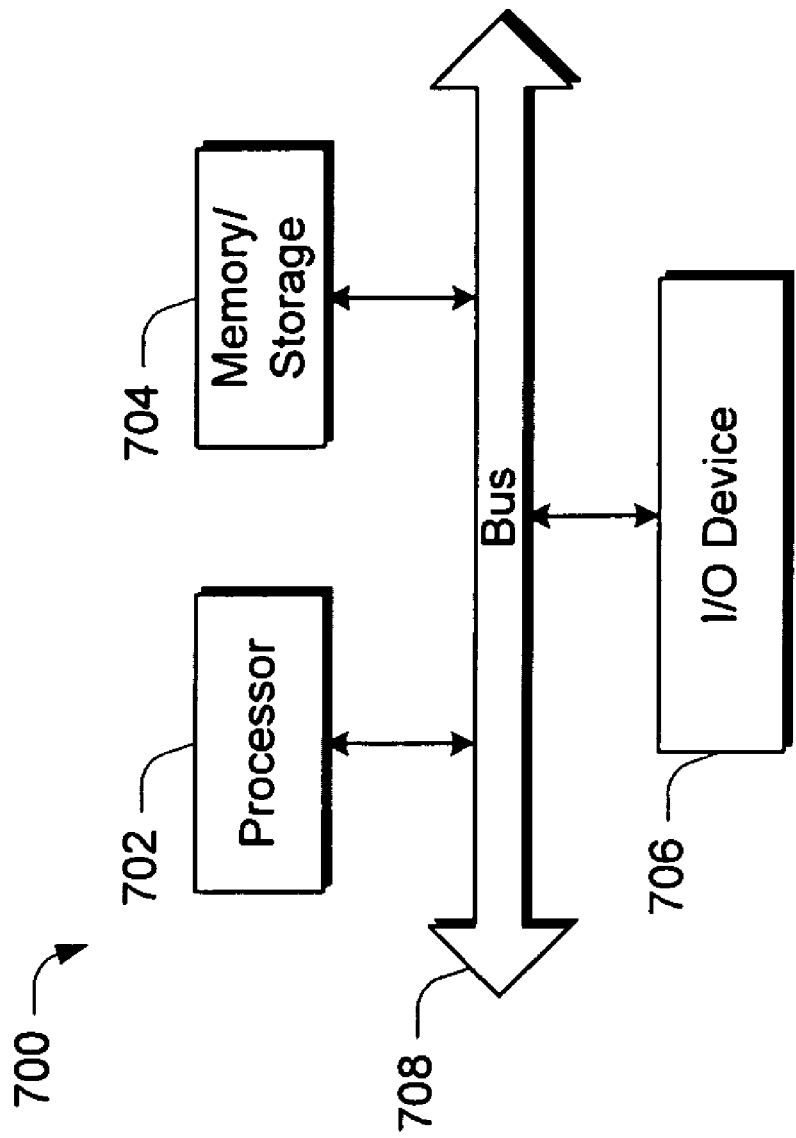

EXTENSIBLE DATA PROVIDER QUERYING AND SCHEDULING SYSTEM

BACKGROUND

In application contexts, such as Web browser contexts, data that is utilized by an application can be stored in various locations. For example, in Web browser contexts, "data" can refer to local sources of user data such as history URLs and/or external sources of data such as search results from third party search providers. In addition, different data sources can store data in different formats. Different data sources can utilize different data access mechanisms which can complicate matters when an application wishes to retrieve and use data from different data sources. Further complications can exist when data comprises different types of data, such as that which is stored in different formats. For example, individual data sources can typically have their own specific associated set of application program interfaces (APIs). This means that an application should be knowledgeable of each of the individual APIs in order to retrieve and utilize data from different data sources.

In the environment of different data sources and different types of data, it is difficult to access collections of data from different sources. Additionally, it is difficult to seamlessly add new data sources that are to be used by an application because the new data sources may employ access mechanisms that are unknown to an application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide an independent layer between an application user interface and various data sources so that both the user interface and data sources can be added to, removed, or modified without affecting the other. The independent layer provides scalability to allow data sources and data providers to be plugged into a system in an easy manner.

In one or more embodiments, the independent layer provides a common set of query APIs that can be used by client applications to make queries on one or more data sources. The independent layer then communicates the queries to one or more data providers associated with individual data sources. Queries are executed on the data sources and results are returned back up through the data providers and independent layer for consumption by a client application. In at least some embodiments, the client application comprises a Web browser that makes use of the independent layer.

BRIEF DESCRIPTION OF THE DRAWINGS

The same numbers are used throughout the drawings to reference like features.

FIG. 7 illustrates an example system that can be used to implement one or more embodiments.

DETAILED DESCRIPTION

Overview

Various embodiments provide an independent layer between an application user interface and various data sources so that both the user interface and data sources can be added to, removed, or modified without affecting the other. The independent layer provides scalability to allow data sources and data providers to be plugged into a system in an easy manner.

In one or more embodiments, the independent layer provides a common set of query APIs that can be used by client applications to make queries on one or more data sources. The independent layer then communicates the queries to one or more data providers associated with individual data sources. Queries are executed on the data sources and results are returned back up through the data providers and independent layer for consumption by a client application. In at least some embodiments, the client application comprises a Web browser that makes use of the independent layer.

In the discussion that follows, a section entitled "Operating Environment" is provided and describes one environment in which one or more embodiments can be employed. Following this, a section entitled "Example Embodiment—General" is provided and describes a general overview of example embodiment. Next, a section entitled "Example Embodiment with Indexing Mechanism—General" is provided and describes an example embodiment that utilizes an indexing mechanism in accordance with one or more embodiments. Following this, a section entitled "Example Method" is provided and describes an example method in accordance with one or more embodiments. Next, a section entitled "Example Web Browser Embodiment—Implementation Example" describes an implementation example in the Web browser context in accordance with one or more embodiments. Last, a section entitled "Example System" is provided and describes a system that can be utilized to implement one or more embodiments.

Operating Environment

Figure 1:
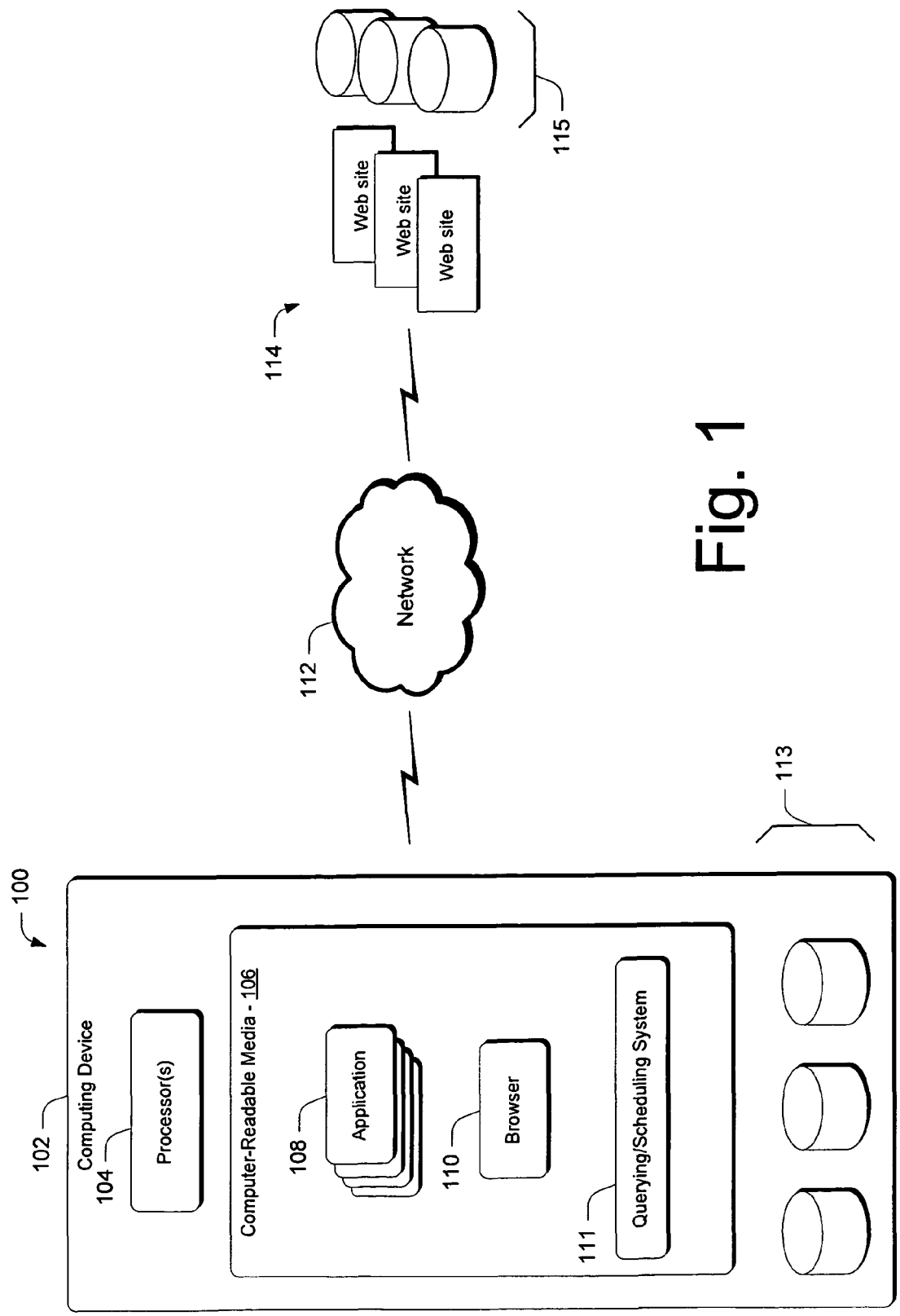
FIG. 1 illustrates a system in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 7.

In addition, computing device 102 includes a software application in the form of a Web browser 110. Any suitable Web browser can be used examples of which are available from the assignee of this document and others. In addition, an independent layer in the form of a querying/scheduling system 111 is provided and serves to interface between applications 108, Web browser 110, and a plurality of data sources comprising local data sources 113 and/or remote data sources 115. In addition, environment 100 includes a network 112, such as the Internet, and one or more web sites 114 from and to which content can be received and sent.

In at least some embodiments, applications 108 and/or Web browser 110 are configured to utilize the querying/scheduling system 111 to access the various data sources. These data sources can and typically do store data in different formats and can have their own specific access mechanisms of which an application or Web browser is unaware.

In one or more embodiments, querying/scheduling system 111 presents a common set of querying APIs as well as other APIs that can be used by applications to access data that is stored in the various data stores. By providing a standardized or common set of querying APIs, various data sources can be plugged into the system without requiring the applications to be specifically knowledgeable about the access mechanisms that are used to access stored data.

Computing device 102 can be embodied as any suitable computing device such as, by way of example and not limitation, a desktop computer, a portable computer, a handheld computer such as a personal digital assistants (PDA), cell phone, and the like.

EXAMPLE EMBODIMENT

General

Figure 2:
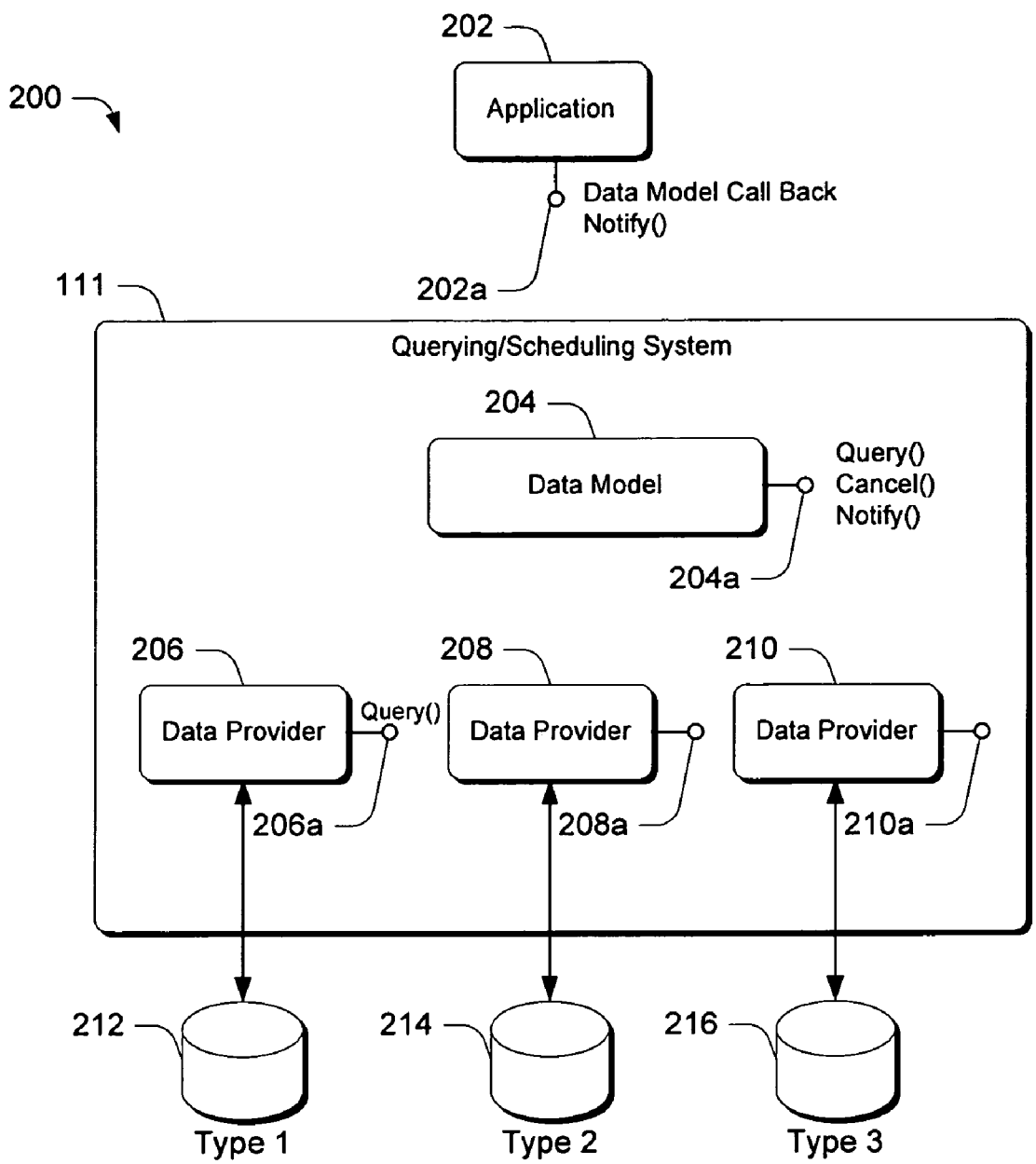
FIG. 2 illustrates an example system in accordance with one or more embodiments.

FIG. 2 illustrates a system in accordance with one embodiment generally at 200. In this example, system 200 includes an application 202, a querying/scheduling system 111 which includes a data model 204 and a plurality of data providers 206, 208, and 210. Multiple different data sources are provided at 212, 214, and 216. In this particular example, individual data providers are associated with individual data sources. So, for example, in the illustration, data provider 206 is associated with data source 212, data provider 208 is associated with data source 214, and data provider 210 is associated with data source 216. In the illustrated and described embodiment, the data sources can comprise different types of data sources each with their own particular data access nuances. The individual associated data providers are knowledgeable of the data access nuances, such as any specialized interfaces or access requirements, and can access and query their associated data source. As such, the data providers can be said to wrap an associated data source.

In at least some embodiments, the data providers are COM components that can be co-created by the data model. The data providers can be created on the same thread as the data model. Alternately or additionally, the data providers can be created on a worker or background thread for reasons that are discussed below. As will be appreciated, the data providers need not, however, be COM components. As such, other types of components can be used without departing from the spirit and scope of the claimed subject matter.

In operation, application 202 exposes an interface 202a which essentially provides a callback interface that can be used to return search results through a Notify( ) method that can be called. Data model 204 exposes an interface 204a that includes various methods that can be called to conduct searches and return search results. To this end, and in this example, interface 204a includes a Query( ) method, a Cancel( ) method, and a Notify( ) method.

The individual data providers 206, 208, and 210 respectively expose an interface 206a, 208a, and 210a. The individual interfaces include a Query( ) method that can be used to query an associated data source.

When application 202 issues a query, it provides a number of parameters and calls the Query( ) method on the data model 204. In one or more embodiments, the application's call to the data model's Query( ) method is an asynchronous call. In one or more other embodiments, this call can be synchronous. By way of example and not limitation, the parameters included in the application's call can include one or more of a list of class IDs associated with the individual data providers that are desired to be queried, the subject of the query such as any query text or other data that might be utilized in the query, a number of desired results, properties of the data that is to be returned, a sort order or relevancy order, and/or a data model callback which serves as a pointer to interface 202a. The data model's Cancel( ) method can be used to cancel a query and receives as a parameter a query ID described just below.

When the data model 204 receives the query from application 202, it produces a query ID that it returns to the application 202. A query ID identifies the query for subsequent reference by the application. The data model 204 receives the query and, in turn, ascertains, from the included class IDs, which of the data providers are to be queried. The data model 204 then generates appropriate queries for the data providers and then calls the associated providers' Query( ) method. The individual data providers receive the queries and execute them on their associated data sources. Query results are then returned back up through the data model by calling its Notify( ) method and passing in a list of search results. In turn, the data model 204 calls the application's Notify( ) method passing in the returned search results. The application can then use the search results in any suitable way such as by presenting the search results in a suitable user interface. It is to be appreciated and understood that the returned search results can come from one or both of local data sources, such as those illustrated, or remote data sources, such as those shown in FIG. 1.

In this system, the querying/scheduling system is extensible so that new data providers or new data sources can be easily plugged in. By virtue of exposing a common set of APIs to various applications, the data model abstracts away the specific nuances that are utilized to access and query the various data sources. In addition, the common set of APIs also abstracts data providers for applications, such as a browser. In this manner, applications can access new data sources without having to be knowledgeable of the specifics of how access takes place. Rather, an associated data provider that is knowledgeable of new data sources can be plugged into the system and used by the data model to access and consume data from an associated data source.

EXAMPLE EMBODIMENT WITH INDEXING MECHANISM

General

Figure 3:
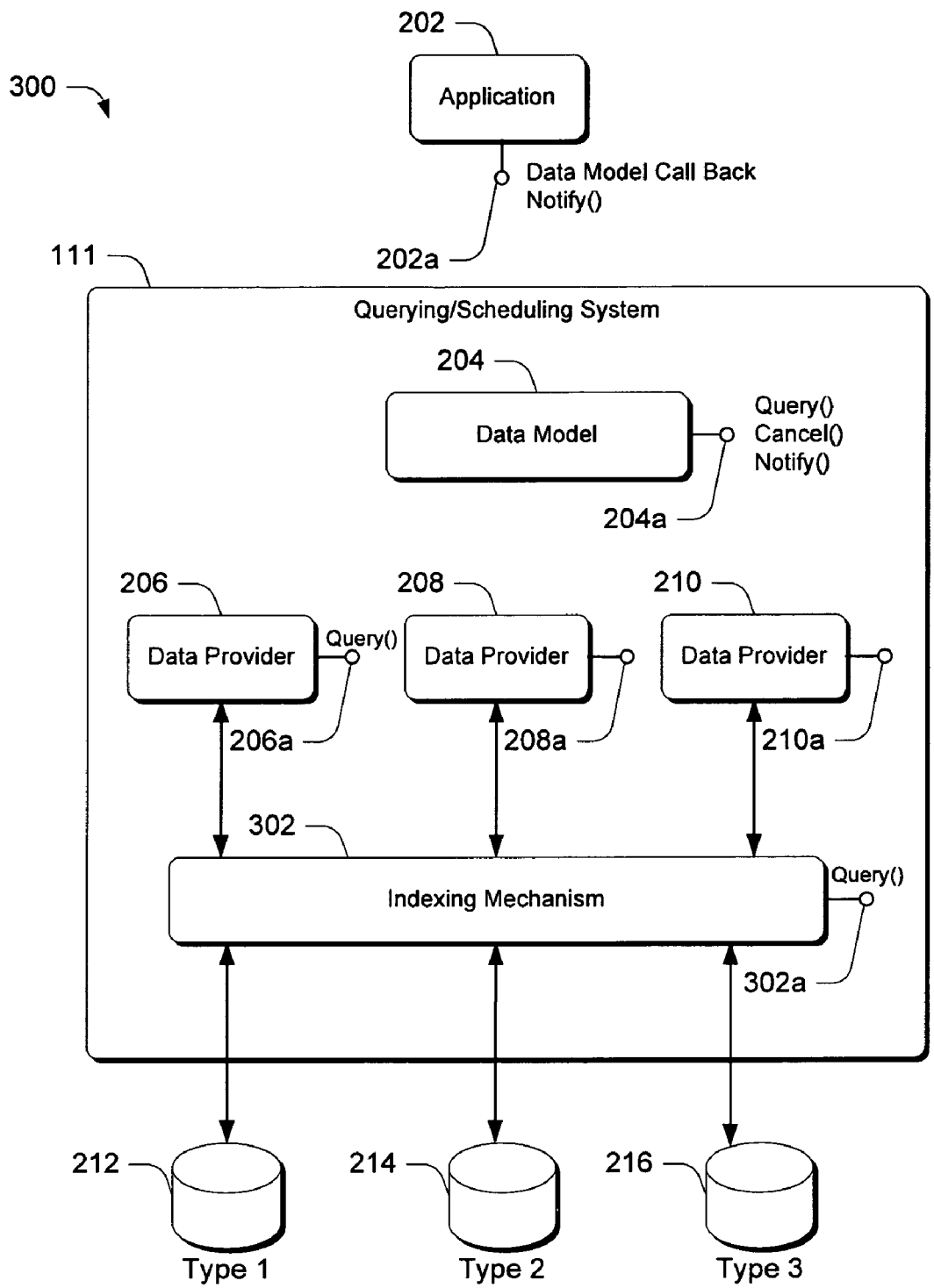
FIG. 3 illustrates an example system in accordance with one or more embodiments.

FIG. 3 illustrates a system in accordance with one embodiment generally at 300. Like numerals from the FIG. 2 embodiment are utilized to depict like components. In this example, system 300 includes an application 202, a querying/scheduling system 111 which includes a data model 204 and a plurality of data providers 206, 208, and 210. In this particular example, an indexing mechanism 302 is provided and serves as an index into multiple different data sources such as those provided at 212, 214, and 216. In one or more embodiments, the indexing mechanism can be extensible so that other indexing mechanisms can be added. In this particular example, individual data providers are associated with individual data sources. So, for example, in the illustration, data provider 206 is associated with data source 212, data provider 208 is associated with data source 214, and data provider 210 is associated with data source 216. In the illustrated and described embodiment, the data sources can comprise different types of data sources each with their own particular access nuances. In addition, indexing mechanism 302 includes or otherwise has access to an index of the content contained in the data sources. Using an indexing mechanism can serve to provide efficiencies in data search and retrieval as will be appreciated by the skilled artisan. Any suitable indexing mechanism can be used an example of which is Microsoft's® Search, as well as others.

In operation, application 202 exposes an interface 202a which essentially provides a callback interface that can be used to return search results through a Notify( ) method that can be called. Data model 204 exposes an interface 204a that includes various methods that can be called to conduct searches and return search results. To this end, and in this example, interface 204a includes a Query( ) method, a Cancel( ) method, and a Notify( ) method.

The individual data providers 206, 208, and 210 respectively expose an interface 206a, 208a, and 210a. The individual interfaces include a Query( ) method that can be used to query an associated data source. In addition, the indexing mechanism includes an interface 302a that includes a Query( ) or similar method that can be called to query one or more data sources.

When application 202 issues a query, it provides a number of parameters and calls the Query( ) method on the data model 204. By way of example and not limitation, such parameters can include one or more of a list of class IDs associated with the individual data providers that are desired to be queried, the subject of the query such as any query text or other data that might be utilized in the query, a number of desired results, properties of the data that is to be returned, a sort order or relevancy order, and/or a data model callback which serves as a pointer to interface 202a.

When the data model 204 receives the query, it produces a query ID that it returns to the application 202. A query ID identifies the query for subsequent reference by the application. The data model 204 receives the query and, in turn, ascertains, from the included class IDs, which of the data providers are to be queried. The data model 204 then generates appropriate queries for the data providers and then calls the associated providers' Query( ) method. The individual data providers receive the queries and call the Query( ) method on the indexing mechanism 302 which then executes the queries on associated data sources. Query results are then returned back up through the data providers and data model by calling the data model's Notify( ) method and passing in a list of search results. In turn, the data model 204 calls the application's Notify( ) method passing in the returned search results. The application can then use the search results in any suitable way such as by presenting the search results in a suitable user interface. It is to be appreciated and understood that the returned search results can come from one or both of local data sources, such as those illustrated, or remote data sources, such as those shown in FIG. 1.

In this system, the querying/scheduling system is extensible so that new data providers or new data sources can be easily plugged in. By virtue of exposing a common set of APIs to various applications, the data model abstracts away the specific nuances that are utilized to access and query the various data sources. In this manner, applications can access new data sources without having to be knowledgeable of the specifics of how access takes place. Rather, an associated data provider that is knowledgeable of new data sources can be plugged into the system and used by the data model to access and consume data from an associated data source. In addition, search efficiencies are enhanced through the use of an indexing mechanism. Further, the indexing mechanism also provides extensibility in that it does not require a new data provider to add more data sources.

EXAMPLE METHOD

Figure 4:
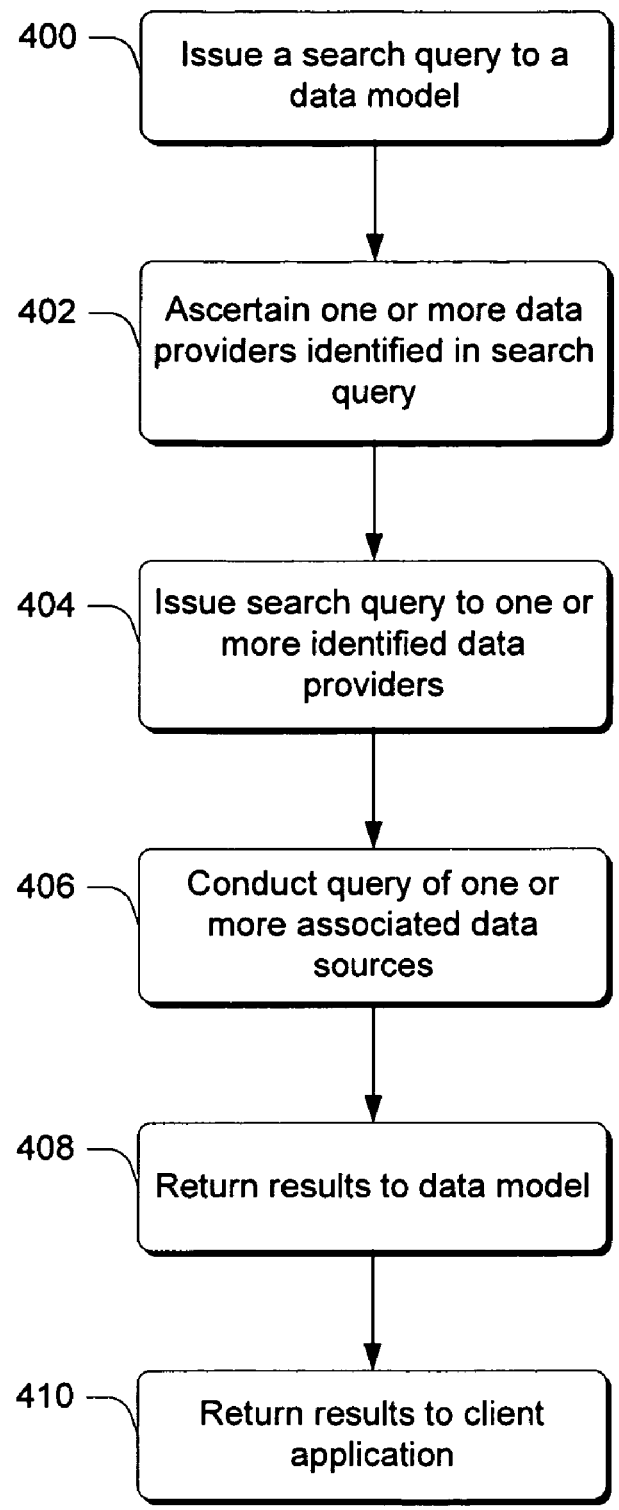
FIG. 4 is a flow diagram that describes steps in a method in accordance with one or more embodiments.

FIG. 4 is a flow diagram that illustrates steps in a method in accordance with one or more embodiments. The method can be implemented in connection with any suitable hardware, software, firmware, or combination thereof. In the illustrated and described embodiment, the method can be implemented using systems such as those shown and described above in connection with FIGS. 2 and 3, as well as other systems described below.

Step 400 issues a search query to a data model. This step can be implemented in any suitable way. For example, in at least some embodiments, the search query can be generated by an application responsive to some type of user action such as entering search text in a suitable user interface. Alternately or additionally, other types of user action can include, by way of example and not limitation, selecting an image or a file such as a multimedia file or a music file. Further, other user actions can include selecting text such as a date or date range to view history or favorites, selecting a rating to view history or favorites, selecting a most recently used or most frequently used option, and/or selecting a web page snapshot (e.g., a preview) to name just a few. In one or more embodiments, the search query can be issued by calling an API exposed by the data model. Step 402 ascertains one or more data providers identified in the search query. This step can be implemented in any suitable way. For example, in at least some embodiments, the search query issued by the application can include one or more parameters that identify associated data providers that are to conduct or otherwise be involved in the search query.

Step 404 issues the search query to one or more identified data providers. This step can be implemented in any suitable way such as, for example, calling a suitably configured API exposed by one or more of the data providers. Step 406 conducts a query of one or more associated data sources. This step can be implemented in any suitable way. For example, in at least some embodiments, the step can be implemented by a data provider executing the particular search query on an associated data source. Alternately or additionally, this step can be implemented by an indexing mechanism that executes the particular search query on one or more data sources.

Step 408 returns search results to the data model. This step can be implemented in any suitable way. For example, a list of search results can be returned through the data providers to the data model. Alternately or additionally, search results can be returned directly to an application by a data provider. Step 410 returns the search results to a client application that issued the initial query. The application can then make use of the search results in any suitable way. For example, in at least some embodiments, the application can display search results for the user, an example of which is provided below.

EXAMPLE WEB BROWSER EMBODIMENT

Implementation Example

Figure 5:
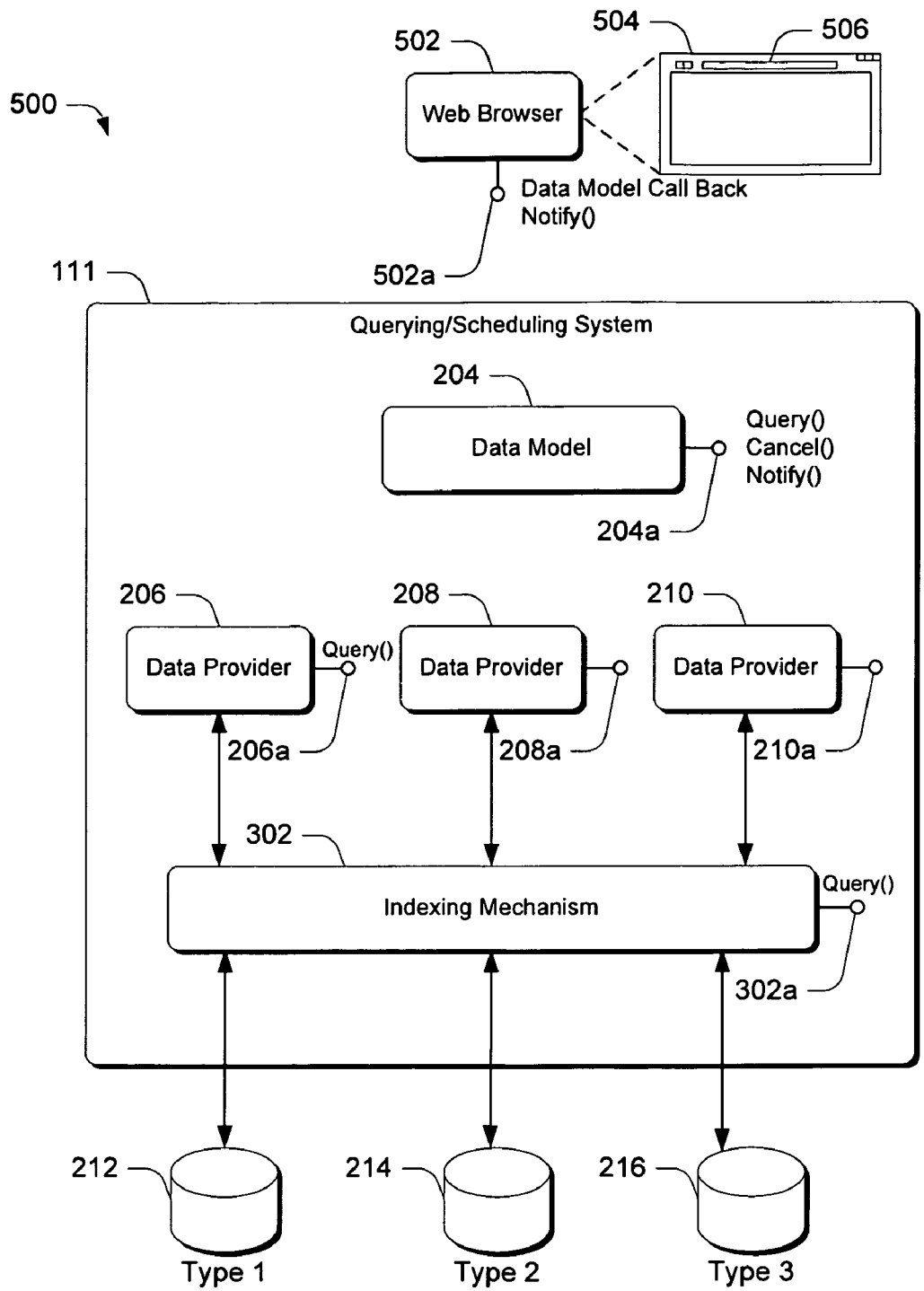
FIG. 5 illustrates an example system in accordance with one or more embodiments.

FIG. 5 illustrates an example system in accordance with one embodiment generally at 500. In this example, like numerals from the FIG. 3 embodiment have been utilized to depict like components. It is to be appreciated and understood, however, that the application of FIG. 5 can be used in a system such as that described in FIG. 2 above. For the sake of brevity, the description of FIG. 5's components is not repeated here.

In this particular example, system 500 includes an application in the form of a Web browser 502 having an interface 502a. Web browser 502 includes a user interface or view 504 that is exposed to the user. In this example, user interface or view 504 includes one or more instrumentalities that can be utilized by a user to spawn a search query as described above. In this particular example, a user instrumentality 506 in the form of an address bar is provided. In operation, as a user enters text into the address bar, a search query is created for the individual letters that the user enters. In one or more embodiments, a user can also select a start tab page, favorites center or a favorite bar to name just a few. Accordingly, as a user enters their text letter by letter, individual search queries are created and the data model 204 is called with each of the individual search queries. Execution of the search queries by the data model can be performed as described above in connection with FIGS. 2 and/or 3.

In the discussion below, an example implementation of the FIG. 5 system is provided. It is to be appreciated and understood, that the described implementation is provided as an example only. Accordingly, other systems having different implementations can be used without departing from the spirit and scope of the claimed subject matter.

In operation, the different data layers that make up system 500, e.g., the data model, data providers, and indexing mechanism are configured to pass up relevant information to the user interface or view 504. The user interface or view, in turn, is able to report down the data layers particular actions that the user has taken. For example, if the user clicks "delete", then the data that has been previously passed down should be removed. The delete action can remove an underlying data object that has been created for a particular search query.

As noted above, a number of different data sources or stores can be used, examples of which are illustrated at 212, 214, and 216. In one or more embodiments, these data sources can include, by way of example and not limitation, a typed URL source, a favorites source, a feeds source, a history source, and/or an Internet search providers source.

Typed URLs can be stored, in one or more embodiments, in the system's registry. The typed URLs source can include both actual URLs that the user has typed, as well as local and network resources (e.g. "c:\foo" or "\\server\share"). In one or more embodiments, these different sources are treated the same in terms of executing search queries. In one or more embodiments, a user's default favorites store is used as the favorites source. Additionally, in one or more embodiments, a default feed store is used as the feeds source. Further, in one or more embodiments, a user's browser history is used as the history source. Further, in one or more embodiments, third-party search providers can plug into the system's data model so that search queries can be conducted across remotely-located data sources.

EXAMPLE DATA LAYER DIAGRAM

Figure 6:
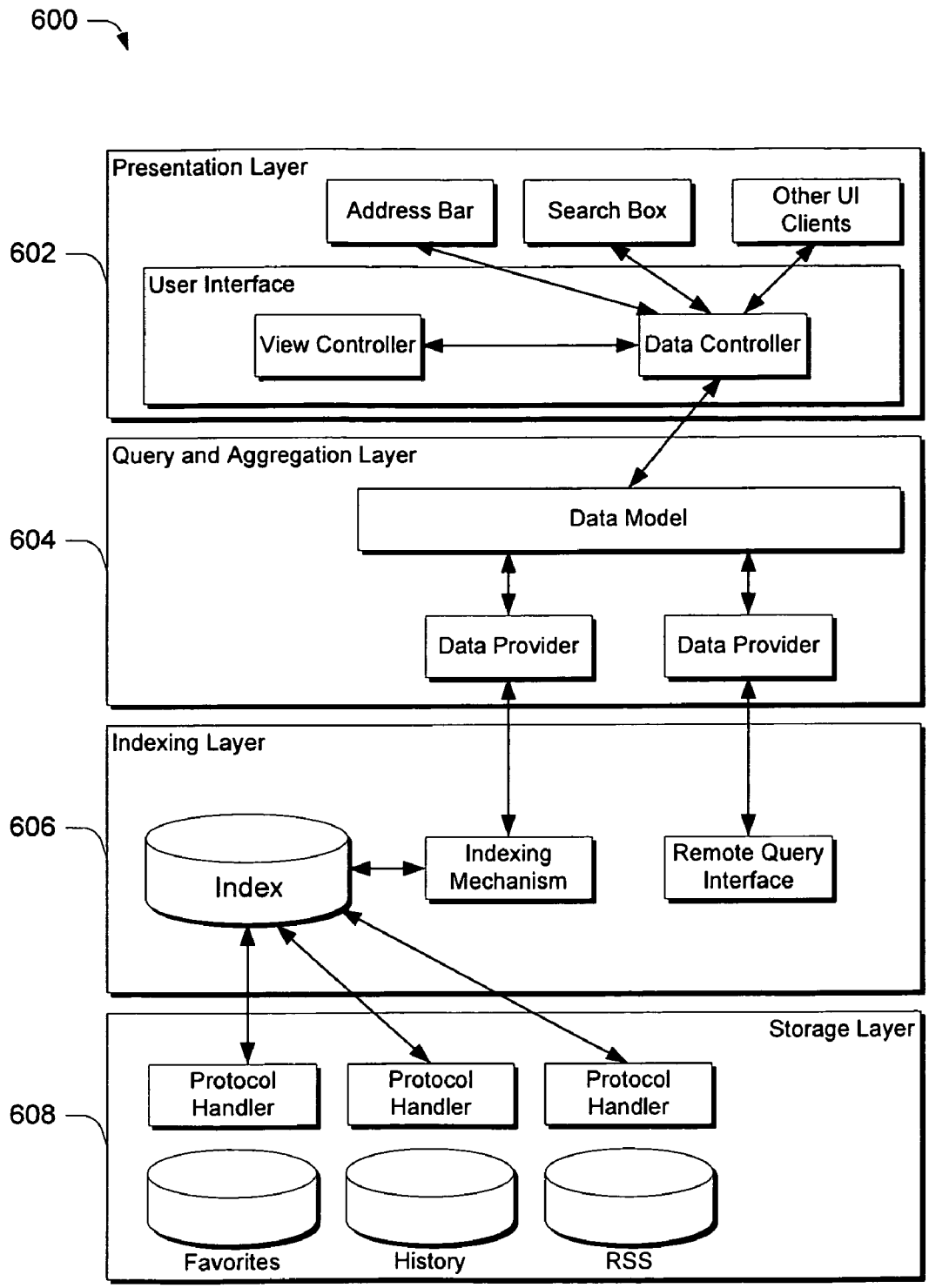
FIG. 6 illustrates an example data layer diagram in accordance with one or more embodiments.

FIG. 6 illustrates an example data layer diagram in accordance with one or more embodiments generally at 600. In this particular example, the data layer diagram corresponds to the system shown in FIG. 5 and provides additional information associated with one implementation of the FIG. 5 system. In this particular example, the data layer diagram includes a presentation layer 602, a query and aggregation layer 604, an indexing layer 606, and a storage layer 608.

Within the presentation layer 602, a so-called view layer is provided by the address bar, search box, and/or other user interface clients (e.g., a favorites center, a "file.open" dialog, a pop-up blocker picker and the like, within the Web browser. An example of a view is a drop-down window provided by the address bar. The view layer and its various components can define which data sources to use, how to handle mouse and keyboard events, how to lay out results and the like. The view layer can also define the number of elements that it wants to have returned to it from the layers below.

The presentation layer's user interface includes two components—a view controller and a data controller. The view controller provides various view options that the user interface has at its disposal, such as all of the various ways to layout results. The data controller provides various data options that the view can have. For example, the data controller can control which data sources are at its disposal. Additionally, the data controller initiates search queries based on keystrokes and/or other user input and serves as a communication interface with the layers below it. Some of the other general responsibilities of the data controller are that it initiates the view controller and data model for its use; it can enumerate the various data sources that are available to a particular view; it can receive query results from the data model and format the results into a user interface view; and, it can cache data results to avoid resubmitting data requests when appropriate.

The query and aggregation layer 604 includes the data model and various data providers. As indicated above, the data model is responsible for distributing queries across providers and across threads if so desired. The data model is also responsible for initiating and/or canceling search queries, as well as handling timers and thread limits. In one or more embodiments, the data model can turn search queries into appropriate SQL commands, distribute the commands to the data providers, collect results, and/or stop or cancel search requests. The data model can, in some embodiments, understand what data sources are available, where the data sources reside, and how to query for each. That is, in at least some embodiments, data sources can be transparent to the data model. In other cases, the data model can receive a class ID associated with a data provider object, create the data provider and then query the data provider. In this case, the data model may not know the type of data source it is wrapping or where that data source resides. It may simply know that the wrapping data provider implements Query( ) and that it can call Query( ) to perform a query given commonly known query data. In one or more embodiments, the data model supports both synchronous and asynchronous communication.

Data providers are the components that communicate with the actual data sources and/or indexing mechanisms or remote query interfaces. The data providers process search queries from the data model and communicate the search queries to the appropriate components in the data layer. In aggregation, the data providers can remove redundant results from the same list if the result appears multiple times from the same data source. If, on the other hand, the same result appears from multiple different sources, the data providers do not remove the same results.

In one or more embodiments, data providers can have different behaviors. As such, threading properties associated with individual data providers can be classified into three groups: synchronous, asynchronous, and persistent. Synchronous threading can be used for data providers that are fast and wish to be run synchronously. In these instances, the data providers are callable on the user interface thread. Some data providers, on the other hand, may be somewhat slower or blocking. In these instances, asynchronous threading can be used and the number of threads that are allocated for their use can be capped. Further, some data providers will process multiple requests in one instance. In these instances, persistent threading or threading which utilizes state between requests can be used. For example, data providers associated with history, favorites, and/or feeds can utilize asynchronous threading because searching may take a variable amount of time. On the other hand, data providers associated with typed URLs can utilize synchronous threading because in at least some implementations, typed URLs utilize a registry lookup and hence, can be processed on the user interface thread.

Accordingly, and to reduce potential data provider performance impact, the data model can utilize a set of guidelines as follows. First, some data providers can run on the user interface thread synchronously. Second, some data providers can run on a temporary worker thread allocated from a pool. Third, some data providers can utilize a single instance that can service and efficiently process multiple requests. Fourth, a limit can be defined as to the number of threads the data model has under its control. This can be done to limit the total number of threads a data model instance can spin up. Fifth, the number of child threads that a data provider can create can be limited. This can ensure that a particular data provider does not utilize all of the threads that a data model can have. Sixth, the number of threads allocated to a single data provider instance can be limited. This can ensure that every data provider gets a fair chance to the thread pool and will not be impacted by other data providers. Seventh, there can be a queue for each data provider class that is blocked waiting for threads so that requests for a particular data provider are throttled. In addition, the data model can employ one or more timers to ensure that time limits are set during operation. For example, input timers can be used to buffer input so the system is not slowed down by feeding it too much input too quickly. For example, typing "Microsoft" may only send "M" as the first input, and then "Microsoft" as the second input. The characters in the middle would be buffered under the input timer. Alternately or additionally, query timers can provide time out periods to limit the amount of time a data provider takes to query. This can reduce the chances of a malicious data provider taking too long and inefficiently using or tying up resources. For example, if it takes more than x amount of time, the query can be killed.

The indexing layer 606 includes one or more indexes as well as an indexing mechanism and a remote query interface. The indexing layer can also have or use local data providers. For example, typed URLs might be stored on local storage but may not be indexed. The indexing mechanism is used to run searches on the index and return results to an appropriate data provider. The remote query interface is used to query third-party providers such as third-party search providers.

The storage layer 608 can, but need not, include different protocol handlers which are responsible for populating the index of indexing layer 606. Individual protocol handlers are associated with different data sources such as the illustrated favorites source, history source, and RSS source. The individual protocol handlers populate the index with data from their associated data source. The storage layer also includes various data sources or data stores which store the actual data. For RSS, favorites, and history, data is stored in a native format and the data model does not deal directly with this layer. Rather, the data model assumes that the indexing layer pulls the relevant data out of the native stores and into the index.

Having described some examples systems and an implementation example, consider now an example system that can be utilized to implement one or more of the above-described embodiments.

EXAMPLE SYSTEM

FIG. 7 illustrates an example computing device 700 that can implement the various embodiments described above. Computing device 700 can be, for example, computing device 102 of FIG. 1 or any other suitable computing device.

Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Component 704 can include volatile media (such as random access memory (RAM)) and/or non-volatile media (such as read only memory (ROM), Flash memory, optical disks, magnetic disks, and so forth). Component 704 can include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide an independent layer between an application user interface and various data sources so that both the user interface and data sources can be added, removed, or modified without affecting the other. The independent layer provides scalability to allow data sources and data providers to be plugged into a system in an easy manner.

In one or more embodiments, the independent layer provides a common set of query APIs that can be used by client applications to make queries on one or more data sources. The independent layer then communicates the queries to one or more data providers associated with individual data sources. Queries are executed on the data sources and results are returned back up through the data providers and independent layer for consumption by a client application. In at least some embodiments, the client application comprises a Web browser that makes use of the independent layer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   one or more computer-readable storage media;
   one or more applications stored on the one or more computer-readable storage media;
   a querying/scheduling system embodied on the one or more computer-readable storage media, the querying/scheduling system being configured to present a common set of application program interfaces (APIs) that can be used by the one or more applications to access different data sources and have data stored in the data sources returned to the one or more applications, wherein at least some individual data sources store data in different formats and can have their own specific access mechanisms of which said one or more applications are unaware; and
   one or more data providers embodied on the one or more computer-readable storage media, individual data providers being associated with individual data sources and being knowledgeable of how to access data stored in an associated data source, wherein:
      the querying/scheduling system comprises a data model that can create the one or more data providers; and
      at least some of the data providers can be created on a thread that is a same thread as the data model.

2. The system of claim 1, wherein said one or more applications comprise a Web browser application.

3. The system of claim 1, wherein said different data sources comprise both local data sources and remote data sources.

4. The system of claim 1, wherein at least some of the other data providers can be created on a background thread that is different from a thread on which the data model is created.

5. The system of claim 1, wherein:
   said one or more applications expose a callback interface that can be used to return search results;
   said data model exposes an interface that includes a Query( ) method that can be called by said one or more applications to conduct a search of one or more data sources;
   said one or more data providers expose an interface that includes a Query( ) method that can be used to query an associated data source.

6. The system of claim 5, wherein said one or more applications are configured to issue asynchronous calls to the data model's Query( ) method.

7. The system of claim 5, wherein said one or more applications are configured to include parameters in a call to the data model's Query( ) method, wherein said parameters comprise one or more of:
   a list of class IDs associated with individual data providers that are desired to be queried;
   a subject that is utilized in the query;
   a number of desired results;
   properties of data that is to be returned;
   a sort or relevancy order; and/or
   a data model call back which serves as a pointer to said one or more applications' callback interface.

8. The system of claim 5, wherein the data model is configured to produce a query ID that is returned to said one or more applications responsive to receiving an application's query.

9. The system of claim 1, wherein the querying/scheduling system is extensible so that new data providers can be plugged into the system to access new data sources.

10. A system comprising:
    one or more computer-readable storage media;
    a Web browser stored on the one or more computer-readable storage media;
    an extensible querying/scheduling system embodied on the one or more computer-readable storage media, the querying/scheduling system being configured to present a common set of application program interfaces (APIs) that can be used by the Web browser to access different data sources and have data stored in the data sources returned to the Web browser, wherein at least some individual data sources store data in different formats and can have their own specific access mechanisms of which said Web browser is unaware;
    one or more data providers embodied on the one or more computer-readable storage media, individual data providers being associated with individual data sources and being knowledgeable of how to access data stored in an associated data source, the one or more data providers being configured to receive queries for data from the extensible query/scheduling system, wherein
       the querying/scheduling system comprises a data model that can create the one or more data providers; and
       at least some of the data providers can be created on a thread that is a same thread as the data model; and
    an extensible indexing mechanism embodied on the one or more computer-readable storage media and serving as an index into multiple different data sources, wherein the indexing mechanism is configured to receive queries from one or more data providers and execute the received queries on associated data sources,
    wherein the querying/scheduling system is extensible so that new data providers can be plugged into the system to access new data sources.

11. The system of claim 10, wherein said different data sources comprise both local data sources and remote data sources;
    said local data sources comprising one or more of: a favorites data source, a history data source, and/or an RSS data source; and
    said remote data sources comprising one or more third-party search provider sources.

12. A computer-implemented method comprising:
    issuing, by a Web browser, a search query to a data model, wherein the data model exposes a common set of application program interfaces (APIs) that can be used to access different data sources storing different types of data, wherein said different data sources comprise one or more of a favorites data source, a history data source, and/or an RSS data source;

ascertaining one or more data providers identified in the search query, wherein at least some of the data providers can be created on a thread that is a same thread as the data model;

issuing the search query to one or more identified data providers;

conducting a search query of one or more data sources associated with said one or more data providers;

returning search results to the data model; and returning search results to the Web browser.

13. The method of claim 12, wherein said different data sources comprise one or more remote data sources.

14. The method of claim 12, wherein said issuing, by a Web browser, is performed responsive to a user entering search text in a user interface associated with the Web browser.

15. The method of claim 12, wherein said issuing, by a Web browser, is performed responsive to a user action associated with an interface provided by the Web browser.

16. The method of claim 12, wherein said conducting is performed by a data provider executing a particular search query on an associated data source.

17. The method of claim 12, wherein said conducting is performed by using an indexing mechanism that executes a particular search query for a data provider on an associated data source.

* * * * *